(12) United States Patent
Nassef (10) Patent No.: US 9,063,026 B2
(45) Date of Patent: Jun. 23, 2015

(54) ENERGY HARVESTING POWER OUTPUT MEASUREMENT APPARATUS AND METHODS FOR CYCLING

(71) Applicant: Hany Ramez Nassef, San Mateo, CA (US)

(72) Inventor: Hany Ramez Nassef, San Mateo, CA (US)

(*) Notice: Subject to any disclaimer, the term of this patent is extended or adjusted under 35 U.S.C. 154(b) by 0 days.

(21) Appl. No.: 14/151,797

(22) Filed: Jan. 9, 2014

(65) Prior Publication Data

US 2014/0195103 A1 Jul. 10, 2014

Related U.S. Application Data

(60) Provisional application No. 61/750,782, filed on Jan. 9, 2013.

(51) Int. Cl.
*G01R 13/02* (2006.01)
*G01L 5/22* (2006.01)
*G01L 5/00* (2006.01)
*B60L 11/00* (2006.01)
*A63B 69/16* (2006.01)

(52) U.S. Cl.
CPC ............... *G01L 5/225* (2013.01); *G01L 5/0095* (2013.01); *B60L 11/007* (2013.01); *A63B 69/16* (2013.01); *A63B 2220/12* (2013.01); *A63B 2220/833* (2013.01)

(58) Field of Classification Search
CPC ...... G01L 5/225; B01L 11/007; G01L 5/0095; A63B 2220/833; A63B 69/16; A63B 2220/12
USPC ........................................................ 701/31.5
See application file for complete search history.

(56) References Cited

U.S. PATENT DOCUMENTS

| | | | | |
|---|---|---|---|---|
| 6,450,922 | B1 * | 9/2002 | Henderson et al. | 482/8 |
| 7,017,685 | B2 * | 3/2006 | Schoenberg | 180/2.1 |
| 7,905,815 | B2 * | 3/2011 | Ellis et al. | 482/8 |
| 8,183,726 | B2 * | 5/2012 | Rittenhouse | 310/68 R |
| 8,473,130 | B2 * | 6/2013 | Brady et al. | 701/22 |
| 8,590,655 | B2 * | 11/2013 | Chan | 180/206.4 |
| 2010/0056876 | A1 * | 3/2010 | Ellis et al. | 600/300 |
| 2011/0180341 | A1 * | 7/2011 | Chan | 180/206.4 |
| 2012/0043148 | A1 * | 2/2012 | Brady et al. | 180/206.5 |

* cited by examiner

*Primary Examiner* — Mary Cheung
*Assistant Examiner* — Anne Mazzara
(74) *Attorney, Agent, or Firm* — Jeffery D. Frazier (57) ABSTRACT

The present teachings provide apparatus and methods for measuring the power output of a person, such as a cyclist. According to various embodiments, while measuring the power output, the present teachings provide for the harvesting of the input energy to provide electrical power to the apparatus. Among others, embodiments are described wherein power measurements are obtained from the drive train of a bicycle by making use of piezoelectric element(s) capable of producing electricity when deformed by applied forces. In addition, telemetry information of the applied forces can be obtained with the use of an inertial measurement unit.

16 Claims, 11 Drawing Sheets

ENERGY HARVESTING POWER OUTPUT MEASUREMENT APPARATUS AND METHODS FOR CYCLING

CROSS REFERENCE TO RELATED APPLICATIONS

The present application claims priority to U.S. Provisional Patent Application No. 61/750,782, filed Jan. 9, 2013, incorporated herein by reference.

FIELD

The present teachings pertain to the measurement of power output of a person, such as an athlete. More particularly, the present teachings relate to portable power measurement apparatus, and related methods, for measuring the power output of a cyclist.

BACKGROUND

It is widely agreed that knowledge of an athlete's power output can be used to determine an athlete's overall performance. For example, knowing the power to weight ratio can determine how fast a cyclist can climb a given slope. Or in the case of a flat course time trial, the rider with the highest sustained power output is the likely winner. Aside from the ability to predict performance, knowledge of power output can be used to efficiently and effectively tailor an appropriate training program for that athlete with the ultimate goal being to increase their sustained power output. An effective training program balances the effort intensity, duration, and recovery period in order to continually improve power output and thereby overall fitness level. In addition, for a competitive athlete, an effective training program also includes a scheduled racing program to ensure that the athlete has peak performance for their targeted races. Such precise knowledge and control over an athlete's fitness level is achievable with power output measurements.

At present, commercially available cycling power meters are extremely expensive, making them out of reach for most people who would otherwise directly benefit from a more efficient and effective training program. These power meters rely on traditional strain gauge technology which although reliable, can be costly to manufacture, calibrate, must be temperature compensated, and require precise signal conditioning electronics.

Strain gauges measure deformation by means of changes in resistance to wire traces bonded to the surface of interest. This bonding, if not done properly, can eventually fail, requiring costly repairs at the factory or even discarding of the product altogether. As the deformation occurs, these bonded wire traces are stretched or compressed thereby changing their resistance. Very often these deformations are in the millistrain range and result in extremely small changes in resistance of the bonded wire traces. In order to precisely measure these small changes in resistance, highly regulated, low noise voltage or current supplies are needed. Such small changes in resistance, coupled with the fact that the output signal is proportional to the excitation voltage, the resulting output signal can be extremely small and requires additional amplification to be measured. Amplification of the signal will also amplify the inherent noise in the signal. As such, great emphasis must be placed to minimize or eliminate the sources of noise in the system.

Since strain gauges rely on changes in resistance to bonded wire traces, they are prone to ambient temperature variations which lead to noise and drift in the signal if not properly compensated for. There are various methods to compensate for temperature but they involve the placement of additional strain gauges, thereby increasing the power consumption of the final circuit. This increased power consumption has implications for portable power meters such those mounted on a bicycle.

Commercially available power meters contain electronics that require some sort of battery to provide electrical power. These batteries must be periodically replaced or in the case of some be exchanged by returning the product to the factory. Battery life is a critical issue for these products since the electronics not only measure the forces, but typically also have on board radios that transmit this information wirelessly thereby further increasing the current draw, beyond what is needed to measure strain. As a result, current consumption can be large and drain the battery, thereby requiring frequent replacement. At present, there are no known rechargeable power meters commercially available.

SUMMARY

In various embodiments, the present teachings make use of piezoelectric (also known as "piezo") elements to overcome the issues of complex, costly manufacturing, precise circuitry, and battery life. Piezoelectric elements are much more immune to noise than a traditional foil gauge sensor (Lee, C. K. and T. O'Sullivan. 1991. "Piezoelectric Strain Rate Gages," *Journal of the Acoustical Society of America*, 90(2): 945-953; incorporated herein by reference). A piezoelectric element produces a voltage proportional to the deformation caused by the applied force. This voltage is measured by much simpler electronic circuitry than those of traditional strain gauge sensors. Also, this circuitry inherently eliminates variation due to any sort of cabling that might be needed if the sensors are mounted remotely from the voltage measurement circuitry. Such immunity is not the case for strain gauge sensors where lead wire resistance is an issue that must be addressed.

Aside from producing a voltage signal proportional to the applied force, the resulting voltage from a piezoelectric element signal has the added advantage of being fractioned off to provide input into recharge circuitry to maintain an electrical power supply to the onboard electronics. This allows for eliminating the need to replace batteries altogether. This feature is not possible for currently available power meters.

Among other things, it is an object of the present teachings to utilize the benefits of piezoelectric sensor(s) to provide a simpler, cost effective power measurement solution to the end consumer. Various embodiments thereby allow for a wider use of power output as guidance for more intelligent training programs and, in some embodiments, real-time coaching.

Various aspects of the present teachings relate to a portable rechargeable power meter apparatus for a bicycle. In various embodiments, the bicycle comprises a power transmission system comprising pedals configured for rotation about an axis upon application of a pedaling force and a hub. According to various embodiments, the power meter comprises: (i) a sensor comprising one or more piezoelectric elements positioned at one or more locations along the power transmission system, with the sensor configured to produce an analog electrical signal upon application of the pedaling force; (ii) a board comprising a plurality of electronic components, including: (a) a force measurement unit operatively coupled to the sensor for measuring the analog electrical signal and converting it into a binary value corresponding to the analog electrical signal; (b) an inertial measurement unit for measuring one or more parameters and providing respective binary values corresponding to the one or more parameters; wherein the one or more parameters are selected from the group consisting of acceleration, rotation rate, and magnetic heading; (c) an on-board processor configured to receive the binary values from the force measurement unit and the inertial measurement unit and to process the binary values; (d) a transmitter for sending the binary values to a remote analysis processor; and, (e) an electrical supply for powering the electronic components; (iii) an energy harvester comprising the one or more piezoelectric elements operatively coupled to the power transmission system for harvesting energy upon application of the pedaling force; and, (iv) charging circuitry configured to provide the harvested energy to the electrical supply, whereby in use the power supply is maintained in a properly charged state.

In various embodiments, the apparatus further comprises a GPS device adapted for communication with the on-board processor or the analysis processor.

In a variety of embodiments, the apparatus further comprises a temperature sensor adapted for communication with the on-board processor or the analysis processor.

According to various embodiments, the apparatus further comprises a pressure sensor adapted for communication with the on-board processor or the analysis processor.

In various embodiments, the apparatus further comprises a smartphone or similar smart device, with the remote analysis processor housed within the smartphone. In a variety of embodiments, the smartphone further comprises a memory associated with the analysis processor, and a machine-readable set of instructions adapted for loading into the memory for carrying out an analysis.

According to various embodiments, the apparatus further comprises a tablet computing device, with the remote analysis processor housed within the tablet computing device.

In various embodiments, one or more of the piezoelectric elements of the apparatus are positioned at the pedals and/or the hub.

Various aspects of the present teachings relate to a method for providing performance information to a cyclist using a portable rechargeable power meter apparatus. According to various embodiments, the method can comprise, for example: (i) sensing dynamic forces at one or more locations along a bicycle power transmission system resulting from pedaling motion by a rider, and outputting analog electrical signals directly proportional to the dynamic forces; (ii) sensing one or more parameters selected from the group consisting of acceleration, rotation rate, and magnetic heading; (iii) measuring: (a) the analog electrical signals and converting them into corresponding binary values; and, (b) the one or more parameters and providing respective binary values corresponding thereto; (iv) computing performance parameters comprising power and two or more of: speed, cadence, and gradient; (v) providing performance feedback to the rider; (vi) harvesting energy resulting from the pedaling motion; and, (vii) powering the power meter with the harvested energy.

In various embodiments, the method further comprises transmitting the binary values to a remote location. In some embodiments, the method further comprises analyzing the binary values at the remote location.

According to various embodiments, the performance feedback is visual, auditory, or a combination thereof. In a variety of embodiments, visual feedback is displayed to the rider at the remote location.

In various embodiments, power for the power meter is cycled on and off, with the power being on during the measuring and transmitting steps.

Further aspects of the present teachings relate to a power meter apparatus for a pedal-operated bicycle. In various embodiments, the apparatus can comprise, for example: (i) a sensor comprising one or more piezoelectric elements for producing a signal upon application of a pedaling force; (ii) a first processor for analyzing data; and, (iii) a support including a plurality of electronic components thereon, including: (a) a force measurement unit operatively coupled to the sensor; (b) an inertial measurement unit; (c) a second processor configured to receive data from the force measurement unit and the inertial measurement unit; (d) a transmitter for sending data from the second processor to the first processor; and, (e) an electrical supply for powering the electronic components.

In various embodiments, the apparatus can further comprise (iv) an energy harvester comprising the one or more piezoelectric elements operatively coupled to the power transmission system; and, (v) charging circuitry configured to provide harvested energy to the electrical supply.

DESCRIPTION

Reference will now be made to various embodiments. While the present teachings will be described in conjunction with various embodiments, it will be understood that they are not intended to limit the present teachings to those embodiments. On the contrary, the present teachings are intended to cover various alternatives, modifications, and equivalents, as will be appreciated by those of skill in the art.

Generally, according to various embodiments of the present teachings, the capability to harvest energy from pedaling motion, allows the apparatus of the present teachings to prolong the life of an on board battery or, in some embodiments, eliminate the need for a replaceable battery all together. This benefit can be beneficial over currently available cycling power meters which require constant battery replacement with some requiring shipment back to the factory. In various embodiments, the apparatus of the present teachings can measure forces by means of piezoelectric element(s) placed along a bicycle's power transmission system, e.g., on a pedal body, axle, chain ring, crank arm, or hub. In addition, cycling shoes are in contact with the pedal during the pedaling action, and therefore become part of the bicycle's power transmission system. In another embodiment, piezoelectric elements can also be disposed in the shoe or any cleating system employed with the shoe.

According to a variety of embodiments, an analysis processor for analyzing data can be remotely located from the rest of the device, with the analysis processor being, for example, disposed in a smartphone, a laptop computer, a tablet computing device, a server, or the like. Also, in various embodiments, multiple signals can be received by an analysis processor to analyze a plurality of riders, such as in a gym.

In various embodiments, ceramic type piezoelectric elements are employed. In a variety of embodiments, polymer type piezoelectric elements are utilized; e.g., PVDF (Polyvinylidene Fluoride).

The piezoelectric element(s) once deformed by the applied forces can produce a proportional voltage which can be measured with onboard electronics to determine the applied power. In various embodiments, the apparatus can include an on-board inertial measurement unit (IMU) which can determine, e.g., acceleration, rotation rate, and magnetic heading to compute additional performance parameters such as speed, cadence, and gradient. In various embodiments, the onboard electronics can include, e.g., temperature and pressure sensors. Features such as those just described can allow the apparatus to be the sole sensing attachment on the bicycle. In various embodiments, the apparatus can transmit data wirelessly to a computational device which can analyze and display the data in real time. Further, in various embodiments, feedback can be provided to the rider, effectively providing a real-time coach.

According to various embodiments, examples of real-time coaching can incorporate, e.g., the rider's route, course profile, and the rider's training history. The real-time coaching application can have a history of a rider's performance parameters, and can update those parameters based on the then-current ride. In accordance with various embodiments: It can advise the rider on the proper gearing, and cadence for the given course profile. It can manage the number of hard efforts and their duration during the ride to ensure proper recovery for the next ride. It can maintain an over exertion budget above the sustained power output and suggest recovery periods so as to not reach an over-exertion state. It can monitor the rider's health by comparing their heart rate to their power output. It can inform the rider on hydration and nutrition based on the ambient conditions surrounding the rider. In the event a personal trainer is used, it can ensure the rider adheres to the prescribed training regimen of their personal trainer. It can inform the rider of when to train again so as to not lose the benefits of the current exercise session. It is also contemplated herein, according to various embodiments, that the computational device can receive signals from multiple power meter units, such as those from other nearby riders and provide coaching guidance to the overall group of riders or individually.

In accordance with various embodiments, in order to measure the power output of the cyclist, one or more sensing elements can be placed as part of the power transmission system or mechanics of the bicycle. These locations can include, for example, one or more of the pedal, crank, spider, chain ring, hub, drive shaft, shoe and/or cleat. One advantage of employing a piezoelectric sensor is that it can be easily replaced since, according to various embodiments, it need not be physically bonded to any part of the drive train as is the case with strain gauge power meters. For example, this can allow the user to continue to use the product while a replacement sensing element is ordered, rather than having to return the product to the factory.

According to various embodiments, one advantage of the piezoelectric sensor is that it produces voltage when deformed. This voltage is proportional to the deformation and thereby the applied force. The resulting voltage can be relatively large depending on the deformation. The voltage can be, for example, in the range of from about 10s to about 100s of volts. These large voltages do not need amplification such as that needed for strain gauges as previously discussed. As a result, according to various embodiments, noise in the signal is not amplified.

In various embodiments, the pedaling forces are to be directed onto the surface area of the piezoelectric element(s), while simultaneously making electrical contact to the element(s). Therefore, it can be desirable that the electrical contacts be such that they not pose stress points to the piezoelectric elements themselves. If stress points exist, it is possible that they might damage the elements, causing cracks that ultimately lead to failure of the elements. For example, soldering a lead wire directly to a piezoelectric element can sometimes lead to failure since the applied forces could be concentrated at the solder point and potentially lead to cracks there. Therefore, electrical contacts to the piezoelectric elements, as contemplated by various embodiments herein, can be flat and uniform throughout the contact area, and can extend outward from the piezoelectric element, where lead wire/cabling can be soldered.

The pedaling forces serve to deform the piezoelectric element, and as such, in various embodiments, it can be desirable not to allow the pedaling forces to deform the piezoelectric element to failure. Thus, as contemplated by various embodiments of the present teachings, the piezoelectric element can be contained in a housing that can mitigate or prevent the applied forces from unduly or over compressing the piezoelectric element.

Due to the physics of how voltage is produced in a piezoelectric element, it is not considered suitable to measure static forces, since the produced voltage would quickly dissipate. When the measurement circuitry is tuned for the frequency of the applied forces, the piezoelectric element is well suited to measure the dynamic forces applied.

The dynamic pedaling forces applied to the bicycle drive train contain both compressive and tension forces. Tension forces exist primarily during the upward trajectory of the pedaling motion. The tension forces are significantly less than the compressive forces applied during the downward trajectory. For example, peak compressive forces in the downward trajectory of the pedal stroke can often be on the order of 100s of Newtons. For efficient pedaling motion, non-retarding tension forces if present can be on the order of 10s of Newtons. Therefore, much of the applied power is determined from the compressive forces. In order to measure any tension forces present, according to various embodiments, the piezoelectric element(s) can have a preset compressed position from their nominal dimensions. When tension forces are being applied, this preset compression is reduced, resulting in an output voltage proportional to the tension forces. This preset compression need not be large since the tension forces are inherently so small.

In the event the applied forces contain transverse components to the surface of the piezoelectric element, additional piezo elements can be used such that their surface is oriented along that transverse direction. Therefore, in this embodiment, the full vector force is available for any further analysis.

In order to measure and perform computations with the analog voltage from the piezoelectric element, it can be digitized by an analog to digital converter or ADC. ADCs are comparators between the voltage to be measured and a known reference voltage. A ratio is determined and reported as a binary value that corresponds to the bit resolution of the ADC. For example, a 12 bit ADC would report a decimal value of 4096 (i.e. 2^12) for the signal if it were exactly equal to the reference voltage. In order for the ADC to make such a comparison, a small current is needed. However, a piezoelectric element is a high impedance device, whereby it can primarily create a charge based on the deformation, and any possible current is often too small to work with a standard low impedance ADC. As such, some sort of circuit is typically utilized between the piezoelectric element and the ADC.

According to various embodiments, two types of circuits are described herein for use with piezoelectric elements. Either a voltage amplifier or charge amplifier can be employed with piezoelectric elements. In various embodiments, the piezoelectric element can be remote to the measuring circuitry and so cabling is used. The charge amplifier circuit is typically employed because it is inherently immune to noise from the lead wires/cables between the piezoelectric element and the sensing electronics. In various embodiments, this circuit can be comprised of an operational amplifier, a feedback capacitor and resistor. The feedback capacitor is used to store the charge that is produced by the piezoelectric element, while the operational amplifier is used to supply the needed current to the ADC. Also, the operational amplifier limits the input voltage to the ADC so as to maintain input voltage values within the specifications of the ADC. The gain of the circuit is determined by the ratio of the feedback capacitor and the capacitance of the piezoelectric element itself.

The frequency response of the charge amplifier circuit is dictated by the RC time constant determined by the feedback resistance and capacitance. This time constant can be made quite large, but not made infinite due to the inherent voltage dissipation of the piezoelectric element previously discussed.

The measuring circuitry is in effect an integrating circuit of the voltages produced at the piezoelectric element. When a deforming force is applied to the piezoelectric element, an imbalance occurs at the input terminals of the operational amplifier. In turn, the operational amplifier attempts to produce an output signal equal to the product of the circuit gain and the voltage imbalance. As a result, the output signal has a predictable form that can be used during data analysis.

The output signal form is governed by the cyclical behavior of the applied forces. In various embodiments where the piezoelectric element is mounted on or integrated with the pedal, as compressive forces are being applied in the down stroke, the output signal decreases reaching a minimum near the bottom of the pedal stroke. The output signal begins to rise once more as compressive forces diminish and/or are replaced with tension forces during the upstroke.

As previously mentioned, a piezoelectric element can be placed at various locations in a bicycle's drive train. For various embodiments where the piezoelectric element is placed on the chain ring or spider, the output voltage signal reflects the power contribution from both legs of the rider, and has been shown in the literature to have a double maxima for a given stroke period. Determining the difference between these maxima gives information of whether a rider is using one leg more than the other to power the bicycle. In other embodiments, placing piezoelectric elements on both crank arms and combining the signals results in similar information about the power output from each leg.

Once the output voltage is acquired, it can be converted to force in order to compute the applied power. A simple derivation shown in Sirohi and Chopra 2000 (Sirohi, J. and Chopra, I. 2000. "Fundamental Understanding of Piezoelectric Strain Sensors," *Journal of Intelligent Material Systems and Structure*, April, Vol. 11:246-257; incorporated herein by reference), shows how this conversion can be performed. It is shown that the time derivative of the strain at the piezoelectric element is proportional to the sum of the time derivative of the output voltage and the output voltage normalized by the feedback RC time constant.

These voltage measurements can be performed by the onboard electronics, which can perform the measurements at some determined discrete sampling rate that defines a duty cycle. During the sampling period, full electrical power can be used, and afterwards can be quickly shut off to conserve power for the remainder of the duty cycle. This shutdown constitutes a "sleep mode". Even though electrical power is being purposefully shut off, voltage is continuously being produced at the piezoelectric element.

To efficiently utilize the continuous voltage produced by the piezoelectric element, various embodiments contemplate the use of two methods that can be utilized either separately or in combination. First, during the sleep mode portion of the duty cycle, piezoelectric voltage can be directly routed to the recharge circuitry. So in essence, the onboard electrical supply is constantly being recharged and the recharging is only briefly paused to perform the sensing operation. Second, if the current draw is large during the sensing operation, and the recharge during sleep mode is insufficient, additional piezoelectric elements dedicated to recharging the electrical supply can be used.

According to various embodiments, recharge circuitry can contain a DC-DC converter and is compatible with some energy storage device such as rechargeable battery, thin film battery, conventional capacitors, or super capacitors. The recharge circuitry can also guard against any over or under voltage situations to safeguard the storage device.

Aside from sensing the applied forces, knowledge of the rotational speed of the crank (cadence) can be employed to perform the power computation. The cadence can be estimated from the piezoelectric output voltage alone. As previously discussed, from the form of the output voltage, the maxima of the signal correspond to a position where compressive forces are low and about to increase. In other words, this position is either close to or the actual top of the pedal stroke. As such, determining the frequency of the maxima can yield the cadence of the stroke.

Even though cadence can be readily determined from the piezoelectric signal alone, various embodiments of the present teachings contemplate the use of an IMU rather than a simple accelerometer alone. This can offer the additional advantage of being the sole attachment to the bicycle and still provide common additional metrics, such as cadence, speed and gradient. A fundamental issue with an accelerometer in motion is that it produces a signal equal to the sum of the linear acceleration and the gravity vector. Without additional information these two components cannot be separated without making some assumptions which may not always be valid for the given dynamics. An IMU combines the use of a gyroscope and magnetometer along with the accelerometer in order to allow for the accurate separation between the gravity vector and the linear acceleration vector.

Having determined the linear acceleration from the IMU, simple integration of the linear acceleration gives the forward speed, and any integration errors such as drift can be corrected for with GPS signals, for example. In addition, determining the gradient is made possible from the gravity vector.

According to various embodiments, placement of the piezoelectric element on the pedal can offer the additional advantage of providing information on the cyclist's pedaling style based on the orientation of the applied force. This type of information can be useful for improving the pedaling efficiency of the rider. For example, the rider could determine if a "heel up" or "heel down" pedaling style is producing more power during their pedaling stoke. The orientation of the applied force is dependent on the pedal angle and crank position. Such information is possible when the on board IMU is also pedal mounted.

According to various embodiments, for a more complete observation of the rider's state, knowledge of the ambient temperature and pressure can be part of the onboard electronics. These environmental conditions can be useful, for example, for determining biological factors such as sweat rate. This information can be used to inform a hydration and nutrition schedule during the cycling activity. In addition, this information can be used to correct for temperature dependent variations in the sensing operation.

Figure 1:
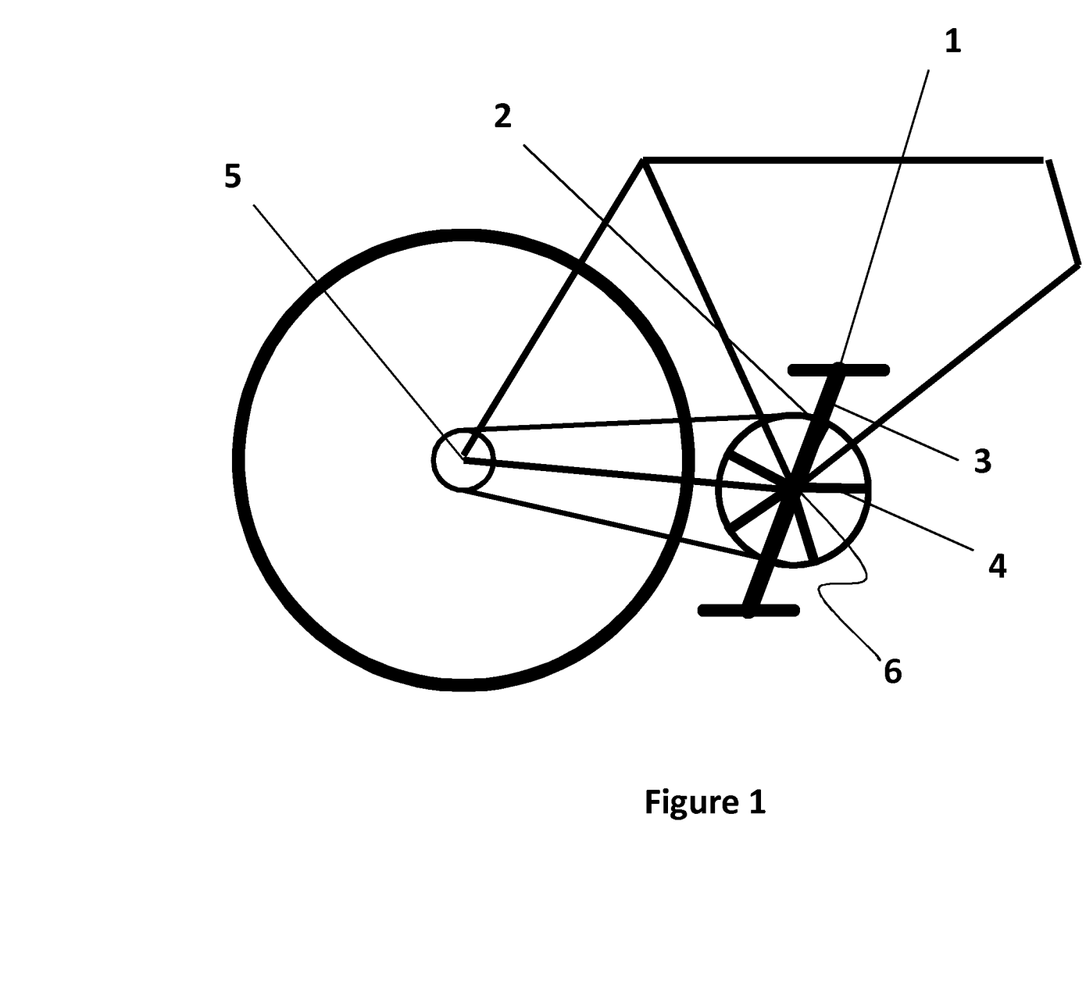
FIG. 1 shows examples of locations where piezoelectric elements can be placed on a bicycle's drive system, according to various embodiments.

FIG. 1 shows examples of locations of where piezoelectric elements can be placed on a bicycle's drive system, according to various embodiments of the present teachings. Reference numeral 1 depicts an embodiment where the piezoelectric element is located on the pedal. Reference numeral 2 depicts an embodiment where the piezoelectric element replaces the standard chain drop pin of a bicycle chain ring. This pin is located between the chain ring and the crank arm. Reference numeral 3 depicts an embodiment where the piezoelectric element is located on the crank arm to measure its bending strain. Reference numeral 4 depicts an embodiment where the piezoelectric element is located on the crank arm spider. Reference numeral 5 depicts an embodiment where the piezoelectric element is located on the hub of the bicycle. Reference numeral 6 depicts an embodiment where the piezoelectric element is located on the drive shaft of the bicycle.

Figure 2:
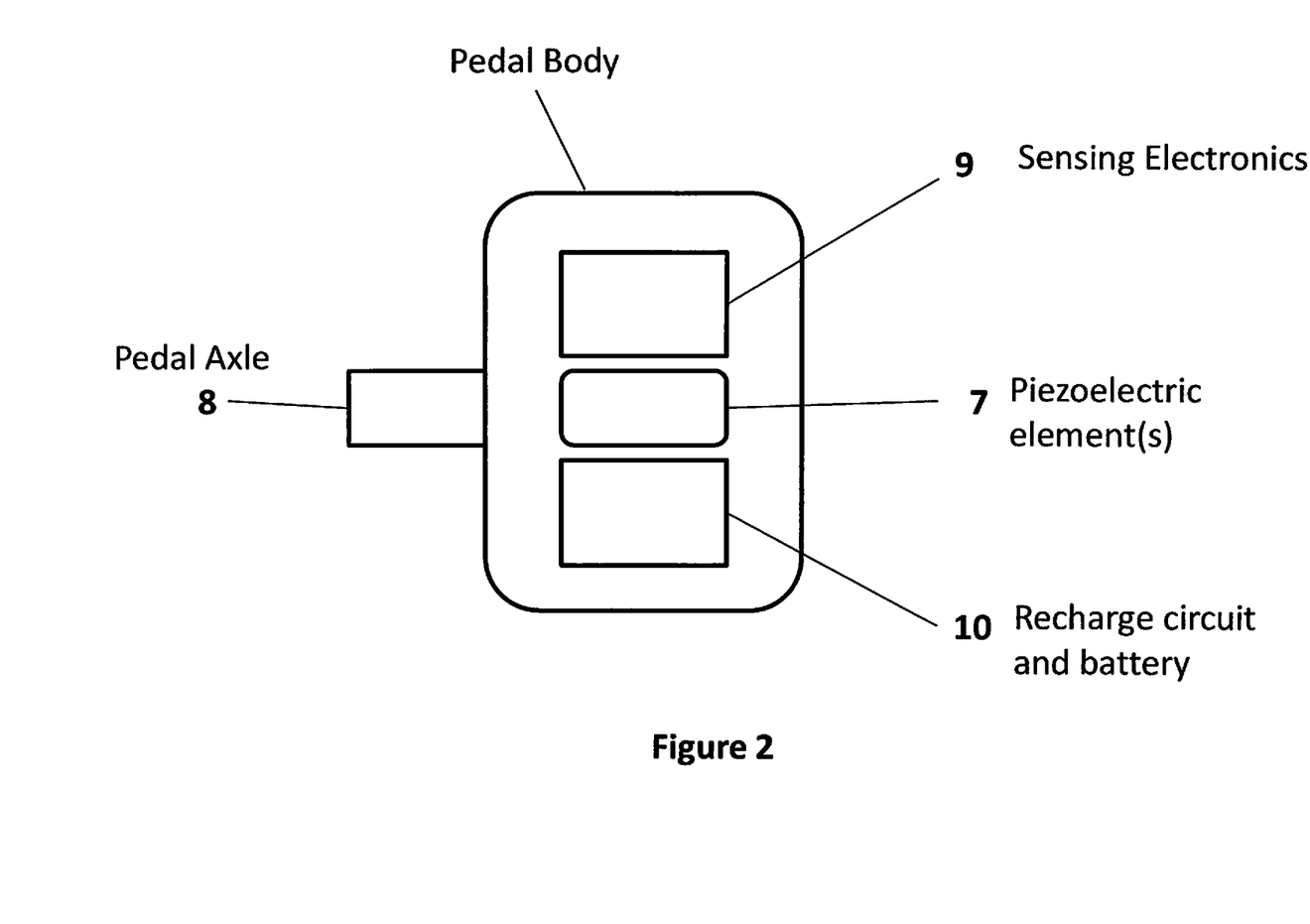
FIG. 2 shows where one or more piezoelectric elements can be placed on a pedal body to measure the applied force, along with contemplated locations of the electronics, according to various embodiments.

FIG. 2 shows an embodiment where one or more piezoelectric elements are located on a pedal body to measure the applied force, along with contemplated locations of the electronics, according to various embodiments of the present teachings. The pedal can be single or double sided sensing and can be configured for various cleating systems. Reference numeral 7 depicts one embodiment where the piezoelectric element is located on the pedal body situated over the pedal axel 8. The cleating system of the pedal directs the applied forces from the rider to the area where the piezoelectric element(s) is(are) located. In another embodiment, the piezoelectric elements can be distributed over the entire area of the pedal, and similarly the cleating system can distribute the forces over the elements. Reference numeral 9 depicts an embodiment where the sensing electronics can be situated on the pedal. Reference numeral 10 depicts an embodiment where the electrical storage and recharge circuitry can be situated.

Figure 3:
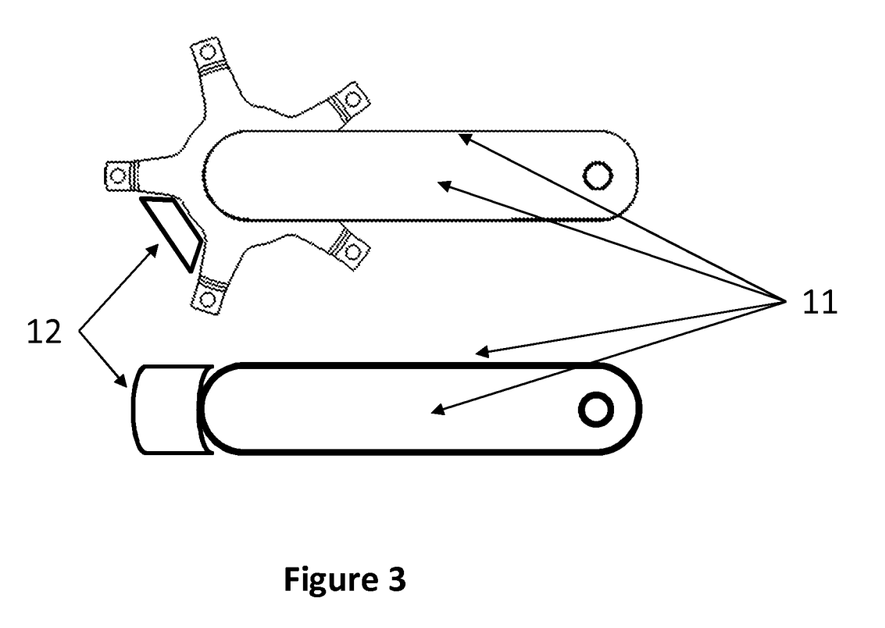
FIG. 3 shows where piezoelectric elements can be mounted to the crank arm to measure the bending strain of the crank arm, according to various embodiments.

FIG. 3 shows an embodiment where piezoelectric elements are mounted to the crank arm to measure the bending strain of the crank arm, according to various embodiments of the present teachings. This bending strain is proportional to the applied torque and is a measure of applied power. Reference numeral 11 depicts an embodiment where the piezoelectric element can either be strapped to or bonded to the crank arm. Reference numeral 12 depicts an embodiment where the onboard electronics can be situated on the crank arms.

Figure 4:
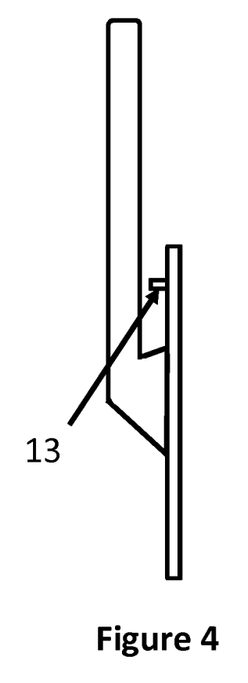
FIG. 4 shows where a piezoelectric element can be placed on the chain ring, according to various embodiments.

FIG. 4 shows an embodiment where a piezoelectric element is located on the chain ring, according to various embodiments of the present teachings. Commercial chain rings typically contain a threaded chain catch pin 13 located between the chain ring and the crank arm. This pin is typically threaded into the chain ring. Since piezoelectric elements are small, in various embodiments, this catch pin can be replaced by a piezoelectric element. The piezoelectric element can be exposed to the applied forces by making it also contact the crank arm. The onboard electronics can be situated, for example, on the crank spider as is shown by 12.

Figure 5:
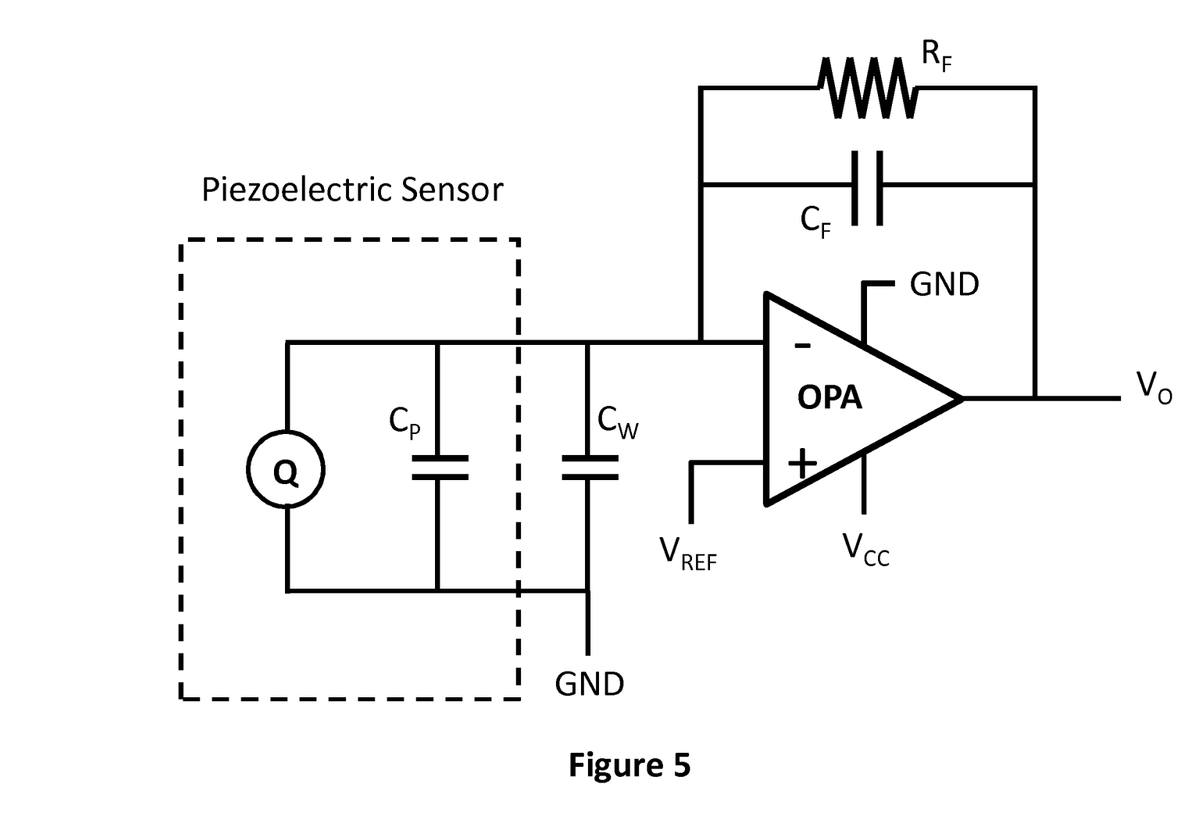
FIG. 5 shows a typical charge amplifier that can be used with a piezoelectric element, according to various embodiments.

FIG. 5 shows a typical charge amplifier that can be used with a piezoelectric element, according to various embodiments of the present teachings. The piezoelectric element is often modeled as a charge source Q in parallel with a capacitor $C_P$. $C_W$ represents the capacitance of any wires or cabling that may be employed if the piezoelectric element is remote to the sensing electronics. Since a piezoelectric element is a high impedance device, in some circumstances it may not provide sufficient current to an analog-to-digital converter or ADC. In addition, the output voltage is often very high and exceeds the specifications of most ADCs. As a result, an operation amplifier OPA can be used to provide sufficient current from the $V_{CC}$ supply to the ADC. OPA can also serve to limit the input voltage to the ADC and maintain it with the ADC's specifications. $V_{REF}$ can be set to the desired level to account for any negative voltages at the piezoelectric element and shift them to the positive voltage detection range of the ADC. A feedback capacitor $C_F$ can be used to store the charge generated from the piezoelectric element. The circuit gain is therefore defined as the ratio between $C_F$ and $C_P$. The feedback resistor $R_F$ defines the time constant of the circuit and allows for setting the frequency response to the desired setting. The output voltage $V_O$ is determined by OPA since it would attempt to produce a signal equal to the product of the circuit gain and any voltage imbalance between its input terminals. These voltage imbalances are of course related to the applied forces since they deform the piezoelectric element.

Figure 6:
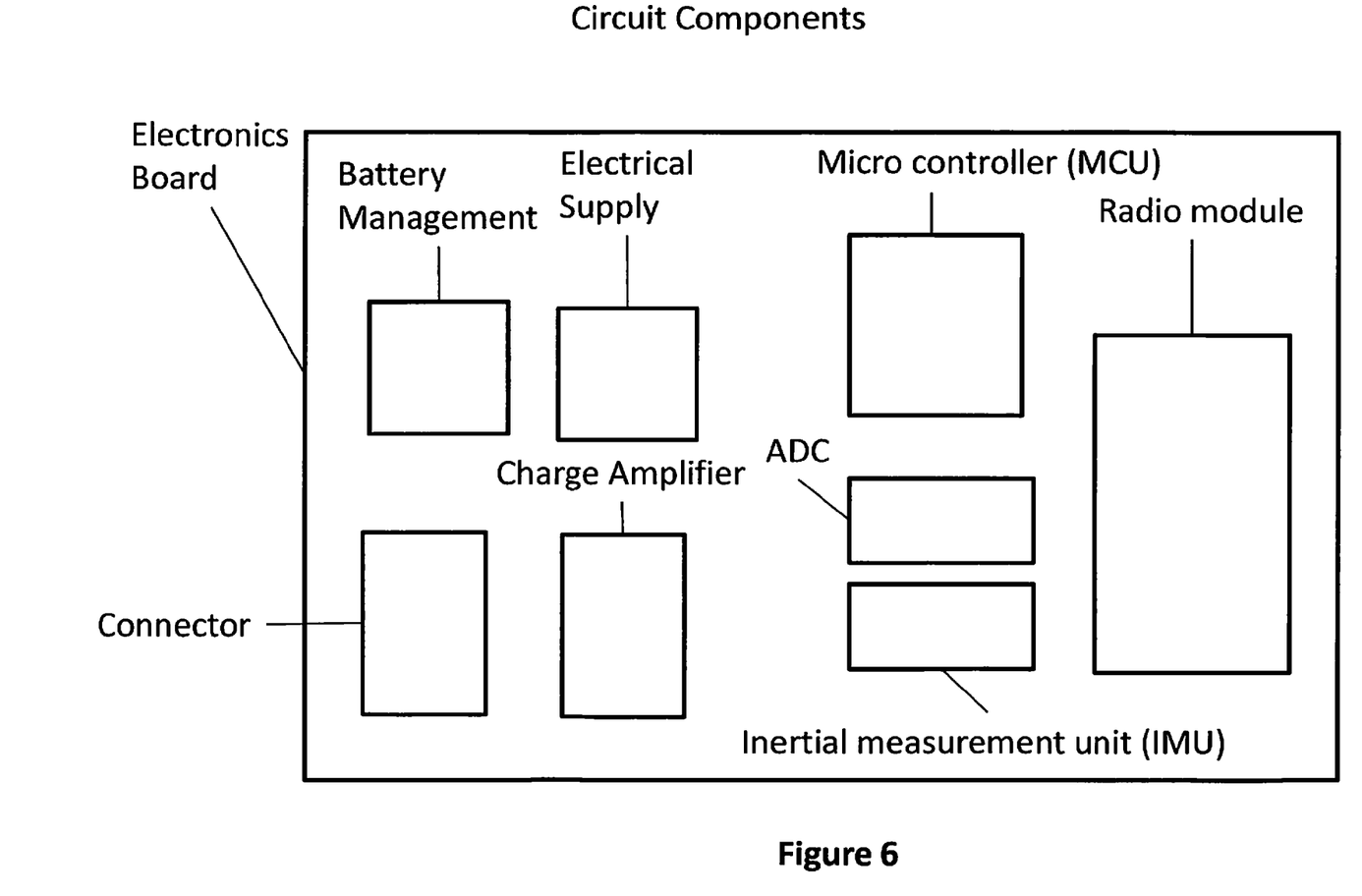
FIG. 6 shows onboard electronics which can measure the piezoelectric voltage produced and transmit such data wirelessly, according to various embodiments.

FIG. 6 shows an embodiment of the onboard electronics which measures the piezoelectric voltage produced and transmits such data wirelessly, according to various embodiments of the present teachings. A connector to the board can be used if the piezoelectric element is located remotely. According to various embodiments, the board can be comprised of the charge amplifier, a microcontroller (MCU), a radio with the desired transmission protocol such as Bluetooth or ANT, an inertial measurement unit (IMU), and recharge circuitry to harvest energy to recharge the electrical supply. Current commercial MCUs contain multichannel ADCs with onboard reference voltage, and come with various bit resolutions. It is common to find 12 bit or 16 bit ADCs on a MCU today. Once the MCU receives all the measured signals, it communicates with the radio to transmit that information. Once this task is complete, the MCU can power down or sleep to conserve electrical power consumption.

Figure 10:
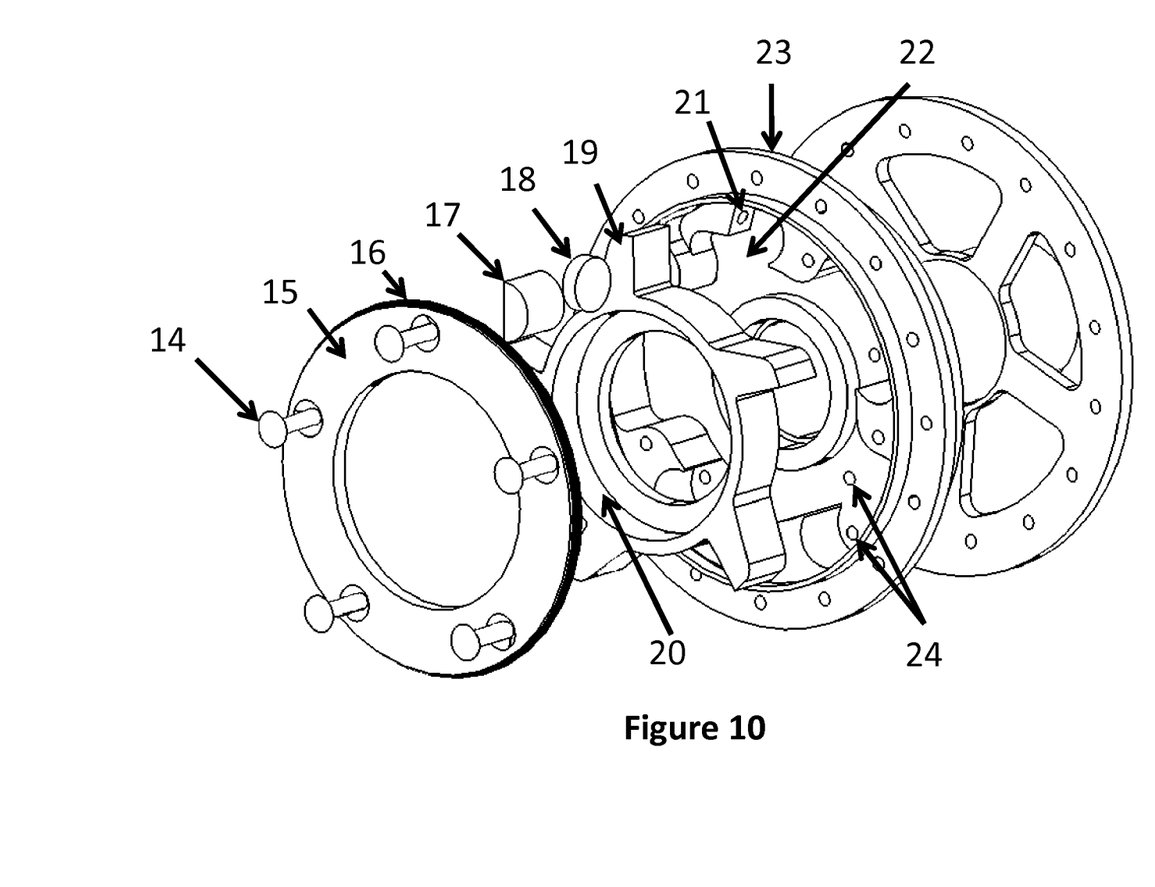
FIG. 10 shows a hub that accommodates one or more piezoelectric elements to measure applied force(s) as well as generate harvestable energy for onboard electronics, according to various embodiments.

FIG. 10 shows an exemplary embodiment of a hub design that suitably accommodates one or more piezoelectric elements to measure the applied force(s) as well as generate the harvestable energy for the onboard electronics. According to various embodiments, piezoelectric element(s) 18 is sandwiched between drive gear 19 and swiveling electrode 17. This combined set (17, 18, and 19) slot into a cavity 22 in hub body 23. In this embodiment, five piezoelectric elements are used, and any combination of them can be used to sense the forces and/or provide harvestable energy to the onboard electronics. In this embodiment, the material, size, position and number of the piezoelectric elements are chosen such that the maximum applied forces will not deform the piezoelectric elements to failure.

Face plate 15 is bolted to the hub body using screws 14, where O-ring 16 makes a seal with the hub body 23 and the face plate 15. This seal protects the piezoelectric element(s) 18 from such things as water, dirt, and grease.

Drive gear 19 may contain a threaded cup 20 that accepts a threaded ratchet in order to work with ratchet+pawl drive systems which are most common in bicycle hubs.

The hub body 23 may contain a set screw port 21 which is used to preload the piezoelectric element(s) 18 against the swiveling electrode 17. As the drive gear compresses the piezoelectric element(s) 18, the swiveling electrode 17 can rotate to accommodate the piezoelectric element(s) 18, providing stress relief, and allowing the applied force to act normal to the face(s) of the piezoelectric element(s) 18.

The drive gear 19 may serve as a common ground electrode for any combination of the piezoelectric element(s) 18 used. The hub body 23, drive gear 19, and face plate 15 are electrically shielded allowing the piezoelectric element(s) 18 to make electrical contact only with the flat faces of the swiveling electrode 17 and the drive gear 19. In addition, hub body 23, maybe electrically shielded such that it may also serve as a common electrode for any combination of the piezoelectric element(s) 18. Each electrode can be accessed through ports 24, whereby the onboard electronics can access the signals from the piezoelectric element(s) 18.

It should be noted, in accordance with various embodiments, that this design may be borrowed to create a force sensing crank spider. Hub body 23 may be replaced with a flange with arms that accept a number of chainrings. This flange would also contain a similar cavity 22 to accommodate the piezoelectric element(s) 18, drive gear 19, and swiveling electrode 17. Rather than the drive gear 19 accepting a threaded ratchet as in the case of the hub, it would instead mate with a crank arm in the case of a crank spider.

EXAMPLES

The following examples are illustrative and not intended to be limiting.

Example 1

Figure 7:
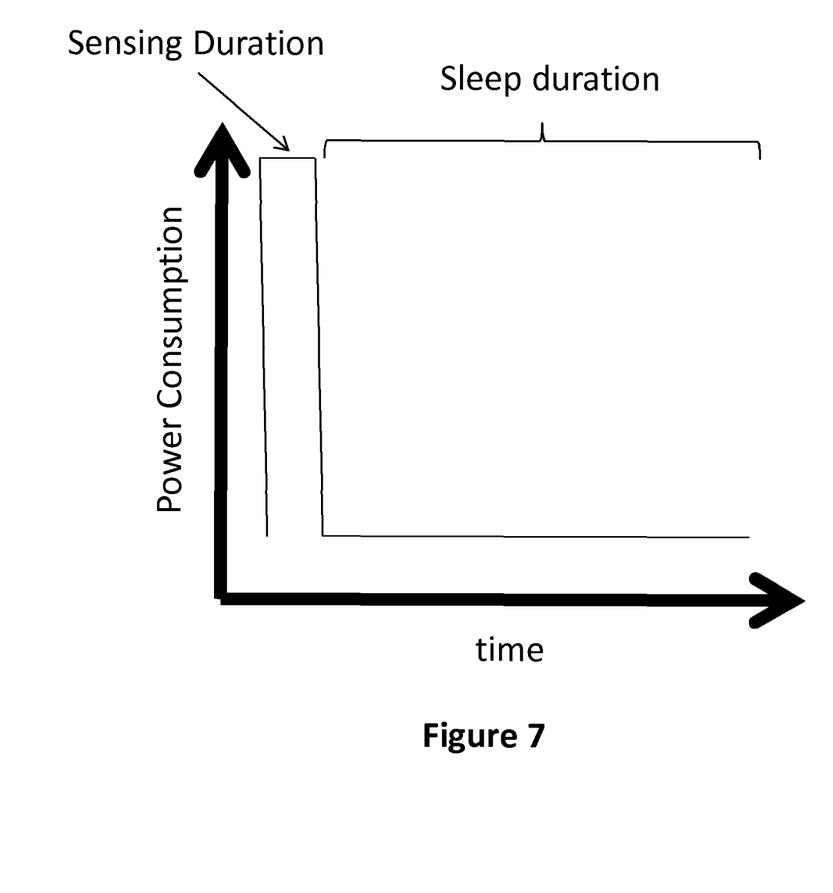
FIG. 7 shows a duty cycle of operation, according to various embodiments.

FIG. 7 shows a duty cycle of operation, according to various embodiments of the present teachings. Signal measurement and transmission can be performed quickly and much of the time (e.g., more than 50%, 75%, 80%, 90%, or 95% of the time) the onboard electronics can be in sleep mode. For example, the sampling rate is sufficiently fast enough to not under sample the pedaling motion. Typical cadence ranges from about 40 to about 100 rpm and typically less than about 300 rpm. Such a cadence range results in a pedaling period on the order of from about 100s to about 1000s of milliseconds. On the other hand, the sensing operation often takes from about 10s to about 100s of micro seconds to perform. Since the piezoelectric element produces voltage continuously, the voltage produced during sleep mode can be harvested to recharge the electrical storage device. If the recharge is insufficient, then additional piezoelectric elements can be dedicated to recharging the electrical supply.

Example 2

Figure 8:
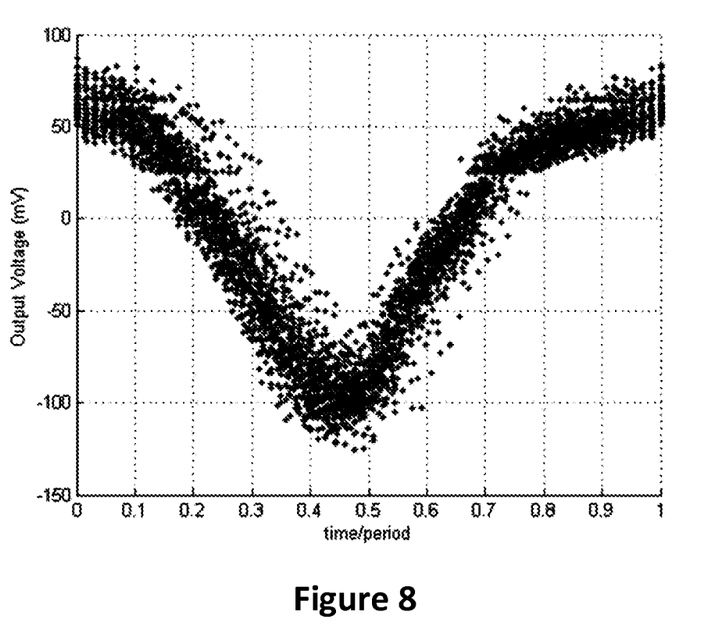
FIG. 8 shows a typical output signal from a pedal outfitted with a piezoelectric element, according to various embodiments.

FIG. 8 shows a typical output signal from a pedal outfitted with a piezoelectric element, according to various embodiments of the present teachings. The rider is pedaling at a uniform cadence for a specified amount of time on a bicycle attached to an indoor trainer. The signal is synced to the maxima of the output voltage and defines the period of the pedal stroke. As can be seen in FIG. 8, the signal initially decreases as a compressive force is being applied to the pedal, finally reaching a minimum at the bottom of the pedal stroke. As the pedal climbs in the latter part of the stroke, the compressive force is decreasing and tending towards becoming a tension force and as a result the voltage signal is seen increasing to its original value.

Example 3

Figure 9:
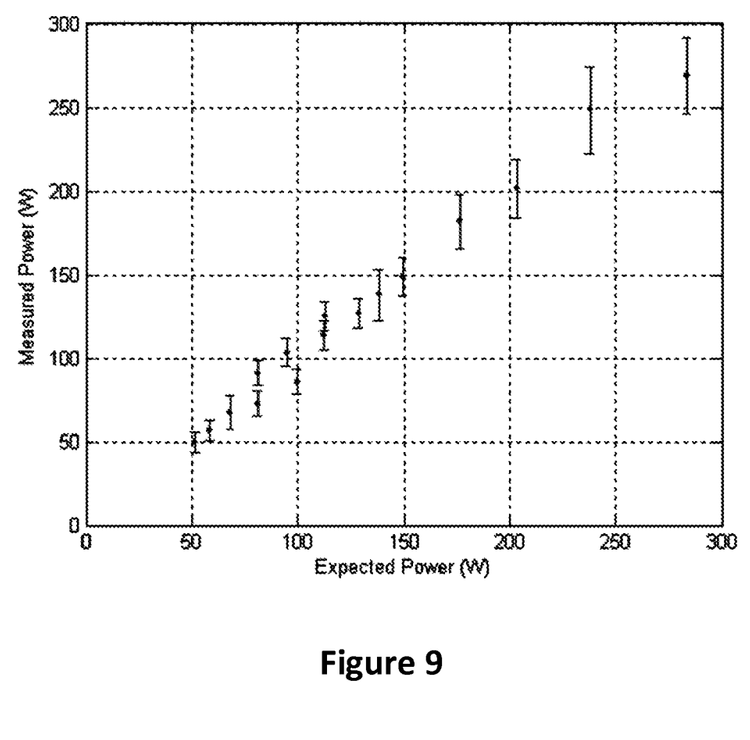
FIG. 9 shows a linear relationship between the output signal of the piezoelectric element and the power required to maintain a fixed cadence of a bike mounted to an indoor trainer, according to various embodiments.

FIG. 9 shows a linear relationship between the output signal of the piezoelectric element and the power required to maintain a fixed cadence of a bike mounted to an indoor trainer, according to various embodiments of the present teachings. The power required is varied by shifting to different gear ratios on the bike. Only the form and magnitude of the piezoelectric element output voltage is used to determine this linearity.

Example 4

Figure 11:
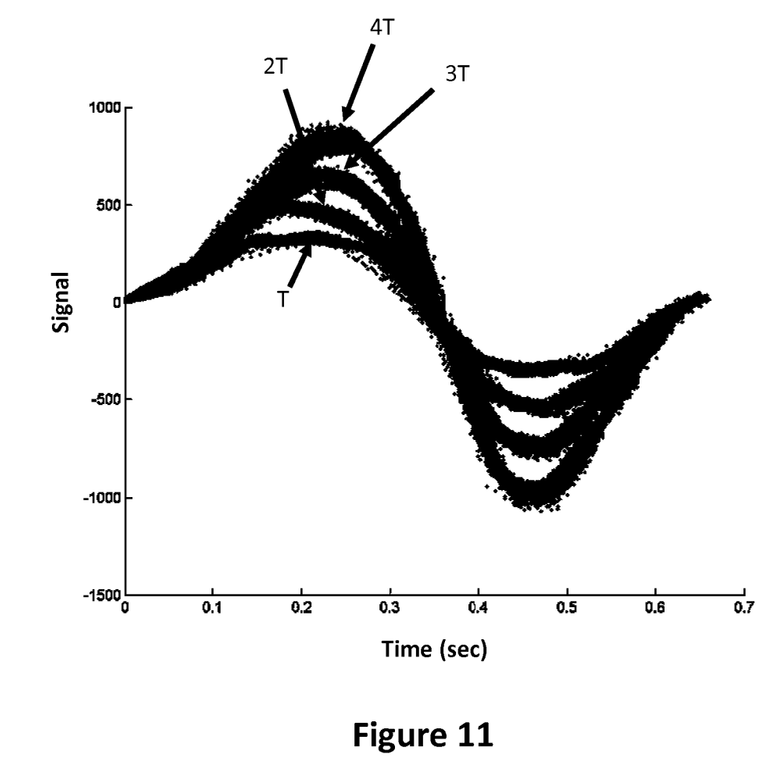
FIG. 11 shows data from a hub, such as in FIG. 10, on a test stand while torque is being dynamically applied, according to various embodiments.

FIG. 11 shows data from a hub mounted to a test stand while torque is being dynamically applied with a computer controlled, motor driven press. The hub did not rotate while in the test stand. The drive gear 19 in FIG. 10 was modified to accept a moment arm that also made contact with the controlled press. The chart shows a phase locked signal from the hub's onboard electronics of a single piezoelectric element. The hub was subjected to various torque levels, each at a fixed number of cycles. Four torque levels are shown in the chart. As the torque is increased, the amplitude of the signal also increases accordingly. The variation in the signal over the entire number of applied cycles for a given torque is less than 1%.

While various theories and principles have been discussed herein, it is not intended that the present teachings be bound by any particular theory.

All references set forth herein are expressly incorporated by reference in their entireties for all purposes.

Those skilled in the art can now appreciate from the foregoing description that the broad teachings herein can be implemented in a variety of forms. Therefore, while the present teachings have been described in connection with various embodiments and examples, the scope of the invention is not intended, and should not be construed to be, limited thereby. Various changes and modifications can be made without departing from the spirit or scope of the present teachings.

It is claimed:

1. A portable rechargeable power meter apparatus for a bicycle; said bicycle including a power transmission system; said power transmission system including pedals configured for rotation about an axis upon application of a pedaling force; said power meter comprising:

(i) a sensor comprising one or more piezoelectric elements positioned at one or more locations along said power transmission system, with said sensor configured to produce an analog electrical signal upon application of said pedaling force;
(ii) a board comprising a plurality of electronic components, including:
  (a) a force measurement unit operatively coupled to the sensor for measuring the analog electrical signal and converting it into a binary value corresponding to the analog electrical signal;
  (b) an inertial measurement unit for measuring one or more parameters and providing respective binary values corresponding to said one or more parameters; wherein said one or more parameters are selected from the group consisting of acceleration, rotation rate, and magnetic heading;
  (c) an on-board processor configured to receive said binary values from the force measurement unit and the inertial measurement unit and to process said binary values;
  (d) a transmitter for sending the binary values to a remote analysis processor; and,
  (e) an electrical supply for powering said electronic components;
(iii) an energy harvester comprising said one or more piezoelectric elements operatively coupled to said power transmission system for harvesting energy upon application of said pedaling force; and,
(iv) charging circuitry configured to provide the harvested energy to the electrical supply, whereby in use the power supply is maintained in a properly charged state.

2. The apparatus of claim 1, wherein said apparatus further comprises a GPS device adapted for communication with said on-board processor or said analysis processor.

3. The apparatus of claim 1, wherein said apparatus further comprises a temperature sensor adapted for communication with said on-board processor or said analysis processor.

4. The apparatus of claim 1, wherein said apparatus further comprises a pressure sensor adapted for communication with said on-board processor or said analysis processor.

5. The apparatus of claim 1, further comprising a smartphone, with said remote analysis processor housed within said smartphone.

6. The apparatus of claim 5, wherein said smartphone further comprises a memory associated with said analysis processor, and a machine-readable set of instructions adapted for loading into said memory for carrying out an analysis.

7. The apparatus of claim 1, further comprising a tablet computing device, with said remote analysis processor housed within said tablet computing device.

8. The apparatus of claim 1, wherein one or more of said piezoelectric elements are positioned at said pedals.

9. A method for providing performance information to a cyclist using a portable rechargeable power meter apparatus; said method comprising:

(i) sensing dynamic forces at one or more locations along a bicycle power transmission system resulting from pedaling motion by a rider, and outputting analog electrical signals directly proportional to said dynamic forces;
(ii) sensing one or more parameters selected from the group consisting of acceleration, rotation rate, and magnetic heading;
(iii) measuring:
  (a) the analog electrical signals and converting them into corresponding binary values; and,
  (b) said one or more parameters and providing respective binary values corresponding thereto;
(iv) computing performance parameters comprising power and two or more of: speed, cadence, and gradient;
(v) providing performance feedback to the rider;
(vi) harvesting energy resulting from said pedaling motion; and,
(vii) powering the power meter with the harvested energy.

10. The method of claim 9, further comprising transmitting said binary values to a remote location.

11. The method of claim 10, further comprising analyzing said binary values at said remote location.

12. The method of claim 9, wherein said performance feedback is visual, auditory, or a combination thereof.

13. The method of claim 12, wherein visual feedback is displayed to the rider at said remote location.

14. The method of claim 9, wherein power for the power meter is cycled on and off, with the power being on during the measuring and transmitting steps.

15. A power meter apparatus for a pedal-operated bicycle comprising a power transmission system, said apparatus comprising:
(i) a sensor comprising one or more piezoelectric elements for producing a signal upon application of a pedaling force;
(ii) a first processor for analyzing data; and,
(iii) a support including a plurality of electronic components thereon, including:
  (a) a force measurement unit operatively coupled to the sensor;
  (b) an inertial measurement unit;
  (c) a second processor configured to receive data from the force measurement unit and the inertial measurement unit;
  (d) a transmitter for sending data from the second processor to the first processor; and,
  (e) an electrical supply for powering said electronic components.

16. The apparatus of claim 15, further comprising:
(iv) an energy harvester comprising said one or more piezoelectric elements operatively coupled to said power transmission system; and,
(v) charging circuitry configured to provide harvested energy to said electrical supply.

\* \* \* \* \*